(12) United States Patent
Konieczny et al.

(10) Patent No.: US 10,504,234 B2
(45) Date of Patent: Dec. 10, 2019

(54) IMAGE PROCESSING APPARATUS AND METHOD

(71) Applicant: HUAWEI TECHNOLOGIES CO., LTD., Shenzhen (CN)

(72) Inventors: Jacek Konieczny, Munich (DE);
Marek Domanski, Poznan (PL);
Olgierd Stankiewicz, Poznan (PL);
Krzysztof Wegner, Poznan (PL);
Adam Łuczak, Poznan (PL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 15/860,662

(22) Filed: Jan. 3, 2018

(65) Prior Publication Data
US 2018/0144491 A1   May 24, 2018

Related U.S. Application Data

(63) Continuation of application No. PCT/EP2015/065191, filed on Jul. 3, 2015.

(51) Int. Cl.
*G06K 9/00* (2006.01)
*G06T 7/55* (2017.01)

(52) U.S. Cl.
CPC ...... *G06T 7/55* (2017.01); *G06T 2207/10028* (2013.01); *G06T 2207/20228* (2013.01)

(58) Field of Classification Search
CPC combination set(s) only.
See application file for complete search history.

(56) References Cited

U.S. PATENT DOCUMENTS

2003/0235344 A1*  12/2003  Kang .................. G06K 9/32
                                                         382/284
2010/0328427 A1   12/2010  Sakano et al.
(Continued)

FOREIGN PATENT DOCUMENTS

CN       104380739 A      2/2015
EP         2657909 A1    10/2013
(Continued)

OTHER PUBLICATIONS

Xuefeng Chang et al. Real-Time Accurate Stereo Matching Using Modified Two-Pass Aggregation and Winner-Take-All Guided Dynamic Programming, 2011 International Conference on 3D Imaging, Modeling, Processing, Visualization and Transmission,IEEE May 16-19, 2011. pp. 73-79. XP31896469A.

(Continued)

*Primary Examiner* — Alex Kok S Liew
(74) *Attorney, Agent, or Firm* — Kilpatrick Townsend & Stockton LLP

(57) ABSTRACT

The present disclosure can provide an image processing apparatus. In some embodiments, the image processing apparatus in accordance with the disclosure comprises memory configured to store a previously selected depth information value ($d_{prev}$), ($d_{prev}$; $d_{prevt}$) having been selected for a previously processed fragment and signal processing logic (103). The signal processing logic is configured to calculate a similarity measure for the current fragment based on a depth information value candidate defining a reference fragment candidate of a digital reference image, compare the depth information value candidate with the previously selected depth information value ($d_{prev}$), apply a weighting function to the calculated similarity measure to obtain a weighted similarity measure for the current fragment based on the comparison, and determine whether to select the depth information value candidate as the depth information (Continued)

value ($d_{best}$) for the current fragment based on the weighted similarity measure of the depth information value candidate.

15 Claims, 6 Drawing Sheets

(56) References Cited

U.S. PATENT DOCUMENTS

| | | | |
|---|---|---|---|
| 2011/0293180 A1* | 12/2011 | Criminisi | G06K 9/38 382/173 |
| 2012/0127270 A1 | 5/2012 | Zhang | |
| 2014/0294289 A1 | 10/2014 | Nakatani et al. | |
| 2014/0321712 A1* | 10/2014 | Ciurea | H04N 13/232 382/106 |
| 2015/0103901 A1 | 4/2015 | Sato | |
| 2015/0288953 A1 | 10/2015 | Kakegawa | |
| 2017/0109884 A1 | 4/2017 | Uemori | |
| 2018/0144491 A1* | 5/2018 | Konieczny | G06T 7/55 |

FOREIGN PATENT DOCUMENTS

| | | |
|---|---|---|
| JP | 2011013706 A | 1/2011 |
| JP | 2012105130 A | 5/2012 |
| JP | 2013545200 A | 12/2013 |
| JP | 2014085120 A | 5/2014 |
| JP | 2014197314 A | 10/2014 |
| JP | 2014206893 A | 10/2014 |

OTHER PUBLICATIONS

Xuefeng Chang et al. Apply Two Pass Aggregation to Real-Time Stereo Matching; IEEE ICALIP2010. pp. 1387-1391. XP31847410A.
Heiko Hirschmuller et al. Accurate and Efficient Stereo Processing by Semi-Global Matching and Mutual Information. Computer Vision and Pattern Recognition,IEEE. Jun. 20-25, 2005. total 8 pages. XP10817537A.
Heiko Hirschmuller et al. Evaluation of Cost Functions for Stereo Matching, IEEE Conference on Computer Vision and Pattern Recognition, 2007. total 8 pages.

* cited by examiner

IMAGE PROCESSING APPARATUS AND METHOD

CROSS-REFERENCE TO RELATED APPLICATIONS

This application is a continuation of International Application No. PCT/EP2015/065191, filed on Jul. 3, 2015, the disclosure of which is hereby incorporated by reference in its entirety.

TECHNICAL FIELD

The present invention relates to an image processing apparatus and method. In particular, the present invention relates to an image processing apparatus and method for selecting a depth information value for a fragment of a digital image.

BACKGROUND

In many known algorithms for estimating the disparity or depth (herein collectively referred to as a depth information value) for a given fragment of a digital image, for instance a pixel or a group of pixels of the digital image, the depth information value is selected as the best one from a set of depth information values under consideration. Often the selection is done by minimizing a cost function $C_{current}(d)$ with respect to the depth information value d for a currently processed fragment.

This cost function can be a purely local fragment matching error or matching cost $M_{current}(d)$ like in the well-known "Winner-Takes-All (WTA) algorithm" described, for instance, in D. Scharstein & R. Szeliski "A taxonomy and evaluation of dense two-frame stereo correspondence algorithms", International Journal of Computer Vision 47, 7-42, 2002. In such algorithms the depth information value for each fragment is selected independently from depth information values of other fragments as $$d_{best} = \arg\min_{d}[M_{current}(d)] \quad (1)$$

where $$\arg\min_{d}[\cdot]$$

denotes the selection of the depth information value d for which the expression within the square brackets is minimal.

The matching error or matching cost $M_{current}(d)$ for the position (x,y) of the fragment in the image and the depth information value d associated with the fragment are usually computed using an error function, which determines the difference between the value of the image I in position (x,y) and the value of the reference image $I_{ref}$ (or images) in position (x+d,y). Usually, the term value of the image refers to color channels or a luminance value of the texture image, but may be also combined with a horizontal and vertical gradient. The commonly used error functions are the sum of absolute differences (SAD) given by the following equation (2) or the sum of squared differences (SSD) given by the following equation (3) (see, for instance, H. Hirschmueller and D. Scharstein, "Evaluation of Cost Functions for Stereo Matching", IEEE Conference on Computer Vision and Pattern Recognition, 2007):

$$M_{current}(d) = SAD(I(x,y), I_{ref}(x+d,y)) = |I(x,y) - I_{ref}(x+d,y)| \quad (2)$$

$$M_{current}(d) = SSD(I(x,y), I_{ref}(x+d,y)) = (I(x,y) - I_{ref}(x+d,y))^2 \quad (3)$$

In more advanced algorithms (like in Viterbi, Forward or Belief Propagation algorithms, also described in the above-referenced article by D. Scharstein & R. Szeliski) a more sophisticated cost function $C_{current}(d)$ is used for minimization and selection of the resulting depth information value. In such a case, $C_{current}(d)$ typically is a sum of $M_{current}(d)$ with a min-convolution of a transition cost function T with costs related to all considered depth information values in neighboring fragments, i.e. additionally includes a smoothing term. In Forward and Viterbi algorithms, the neighboring fragments are those that have already been processed to obtain their depth information value d, and, therefore, $C_{current}(d)$ for a given depth information value d accumulates the cost from all previously processed fragments (designated by the index "prev") considered for the depth information value estimation of the currently processed fragment (designated by the index "current"):

$$C_{current}(d) = C_{prev}(d) \underset{min}{*} T(q, d) + M_{current}(d), \quad (4)$$

where $M_{current}(d)$ is the local fragment matching error for the depth information value d as described before, $C_{prev}(d)$ is the cost for a previously processed fragment for the depth information value d, T(q, d) is a two-argument transition-cost function (cost for changing from depth information value q to depth information value d) and the operator $$\underset{min}{*}$$

denotes the min-convolution, defined as:

$$C_{prev}(d) \underset{min}{*} T(q, d) = \min_{q}(C_{prev}(q) + T(q, d)) \quad (5)$$

wherein $\min_q$ denotes the smallest value with respect to q and both q and d belong to the considered range of depth information values (which is typically set a priori according to the parameters of the visual scene under consideration, i.e. object distance to the cameras). An exemplary transition cost function known from the literature is the Potts model:

$$T_{Potts}(q, d) = \begin{cases} 0 & \text{if } d = q \\ \text{penalty} & \text{if } d \neq q \end{cases} \quad (6)$$

The cost for the current fragment $C_{current}(d)$ is calculated for all depth information values d considered for the depth information value estimation of the currently processed fragment.

In Belief Propagation algorithms, the final selection of depth information values for fragments can be done after multiple iterations of the algorithm.

In Forward algorithms the decision on the selection of the depth information value is done on-the-fly on the basis of the accumulated cost $$d_{best} = \arg\min_{d}[C_{current}(d)].$$

In Viterbi algorithms, the final selection of depth information values is postponed to an additional pass of backtracking, executed when all cost values are known.

The currently known algorithms, that provide high fidelity of the estimated depth information values, in particular disparity or depth values, are computationally complex and not suitable for real-time processing, for instance, on mobile devices. On the other hand, currently known simple depth information value estimation algorithms, that can estimate depth information values in real-time, for instance, on mobile devices, provide limited fidelity of the results obtained.

Thus, there is a need for an improved image processing apparatus and method, in particular an image processing apparatus and method providing high fidelity of the estimated depth information values in a computationally efficient manner.

SUMMARY

It is an objective of the disclosure to provide an improved image processing apparatus and method, in particular an image processing apparatus and method providing high fidelity of the estimated depth information values in a computationally efficient manner.

This objective is achieved by the subject matter of the independent claims. Further implementation forms are provided in the dependent claims, the description and the figures.

According to a first aspect the disclosure relates to an image processing apparatus for selecting a depth information value for a current fragment of a current digital image, wherein the image processing apparatus comprises memory configured to store a previously selected depth information value selected for a previously processed fragment of the same current digital image or a previously processed digital image of same or different view and/or of a same or previous time instant.

Furthermore, the image processing apparatus comprises signal processing logic. The signal processing logic is configured to calculate a similarity measure for the current fragment based on a depth information value candidate defining a reference fragment candidate of a digital reference image, compare the depth information value candidate with the previously selected depth information value, apply a weighting function to the calculated similarity measure to obtain a weighted similarity measure for the current fragment based on the result of the comparison between the depth information value candidate and the previously selected depth information value, and determine whether to select the current depth information value candidate as the depth information value for the current fragment based on the weighted similarity measure of the depth information value candidate.

By weighting the similarity measure, for instance, a matching cost, on the basis of a comparison of a current depth information value candidate for the current fragment with a previously selected/determined depth information value for a previous fragment the first aspect of the disclosure provides an image processing apparatus configured to determine a depth information value for the currently processed fragment in a powerful, yet computationally efficient way.

The term current fragment may also be referred to as currently processed fragment, and the term current digital image may also be referred to as currently processed digital image, etc.

The signal processing logic can be a processor, e.g. a multi-purpose processor or a digital signal processor (DSP), an ASIC, a FPGA, CPU, GPU and the like. The depth information value can be, for example, a depth value, a disparity value, or an index or label representing a depth value or a disparity value. The fragment can be, for example, a pixel or a group of pixels of the current digital image and/or the digital reference image. The similarity measure can be, for example, a matching cost or a matching probability, wherein the matching cost is a measure indicating a difference between the current fragment and the reference fragment and increases with increasing difference and wherein the matching probability is a measure indicating a likelihood/probability that the current fragment and the reference fragment match and decreases with increasing difference. The previously processed fragment can be of the same current digital image or of a previously processed digital image of the same view—temporally preceding digital image—or of a different view—same or previous time instant.

The signal processing logic can be configured to process fragments in serial respectively sequential or in parallel manner, in forward algorithms or any other optimization algorithm in which the convolution step can be substituted by the proposed weighting based on the previous depth information value(s).

In a first possible implementation form of the image processing apparatus according to the first aspect of the disclosure the similarity measure is a matching cost and the weighted similarity measure is a weighted matching cost, wherein the weighting function is configured such that, when the depth information value candidate is different from the previously selected depth information value, the matching cost is increased, and/or such that, when the depth information value candidate is identical to the previously selected depth information value, the matching cost is maintained or only increased to a smaller extent compared to the case where the depth information value candidate is different from the previously selected depth information value.

Thus, changes, also referred to as transitions, of depth information values are penalized or at least penalized more than non-change (e.g. non-transition) cases.

In a second possible implementation form of the image processing apparatus according to the first implementation form of the first aspect of the disclosure the weighting function is configured such that, when the depth information value candidate is different from the previously selected depth information value, the matching cost is increased by adding a first matching cost penalty to the matching cost to obtain the weighted matching cost, or by multiplying the matching cost with a first matching cost penalty to obtain the weighted matching cost, and/or such that, when the depth information value candidate is identical to the previously selected depth information value, the matching cost is maintained or increased, e.g. by adding a second matching cost penalty to the matching cost to obtain the weighted matching cost, or by multiplying the matching cost with a second matching cost penalty to obtain the weighted matching cost, wherein the second matching cost penalty is smaller than the first matching cost penalty.

Thus, changes, also referred to as transitions, of depth information values are penalized or at least penalized more than non-change (e.g. non-transition) cases.

In a third possible implementation form of the image processing apparatus according to the first aspect of the disclosure as such the similarity measure is a matching probability and the weighted similarity measure is a weighted matching probability, wherein the weighting function is configured such that, when the depth information value candidate is different from the previously selected depth information value, the matching probability is decreased, and/or such that, when the depth information value candidate is identical to the previously selected depth information value, the matching probability is maintained or only decreased to a smaller extent compared to the case where the depth information value candidate is different from the previously selected depth information value.

Thus, changes, also referred to as transitions, of depth information values are penalized or at least penalized more than non-change (e.g. non-transition) cases.

In a fourth possible implementation form of the image processing apparatus according to the third implementation form of the first aspect of the disclosure the weighting function is configured such that, when the depth information value candidate is different from the previously selected depth information value, the matching probability is decreased by subtracting a first matching probability penalty from the matching probability to obtain the weighted matching probability, or by dividing the matching probability by a first matching probability penalty to obtain the weighted matching probability, and/or such that, when the depth information value candidate is identical to the previously selected depth information value, the matching probability is maintained or decreased by subtracting a second matching probability penalty from the matching probability to obtain the weighted matching probability, or by dividing the matching probability by a second matching probability penalty to obtain the weighted matching probability, wherein the first matching probability penalty is larger than the second matching probability penalty.

Thus, changes, also referred to as transitions, of depth information values are penalized or at least penalized more than non-change (e.g. non-transition) cases.

In a fifth possible implementation form of the image processing apparatus according to the first aspect of the disclosure as such or any one of the first to fourth implementation forms thereof the signal processing logic is configured to:

calculate a similarity measure for each depth information value candidate of a set of depth information value candidates, each depth information value candidate defining a different reference fragment candidate of the same or a different digital reference image;

compare each of the depth information value candidates of the set of depth information value candidates with the previously selected depth information value;

apply for each of the depth information value candidates a weighting function to the corresponding calculated similarity measure to obtain for each of the depth information value candidates a corresponding weighted similarity measure for the current fragment, wherein for each of the depth information value candidates the weighting function is applied based on the corresponding result of the comparison; and select the depth information value for the current fragment from the depth information value candidates of the set of depth information value candidates based on the weighted similarity measures.

Thus, the depth information value is estimated in an efficient (low complexity) but at the same time improved (with regard to estimation quality) way.

In a sixth possible implementation form of the image processing apparatus according to the fifth implementation form of the first aspect of the disclosure the similarity measure is a matching cost and the signal processing logic is configured to select the depth information value from the depth information value candidates of the set of depth information value candidates, which has the smallest weighted matching cost; or the similarity measure is a matching probability, and the signal processing logic is configured to select the depth information value from the depth information value candidates of the set of depth information value candidates, which has the largest weighted matching probability.

Thus, the depth information value is estimated in an efficient (low complexity) but at the same time improved (with regard to estimation quality) way.

In a seventh possible implementation form of the image processing apparatus according to the first aspect of the disclosure as such or any one of the first to fifth implementation forms thereof, the signal processing logic is configured to determine the depth information value for the current fragment by sequentially processing depth information value candidates of a set of depth information value candidates, wherein the signal processing logic is configured to:

calculate a similarity measure for a current depth information value candidate of the set of depth information value candidates;

compare the current depth information value candidate with the previously selected depth information value;

apply the weighting function to the similarity measure of the current depth information value candidate of the set of depth information value candidates to obtain a weighted similarity measure depending on the comparison;

compare the weighted similarity measure of the current depth information value candidate with a currently best similarity measure associated to a currently best depth information value;

when the weighted similarity measure of the current depth information value candidate does not fulfill an update condition with regard to the currently best similarity measure, e.g. the weighted matching cost is larger than the currently best matching cost (when matching costs are used as similarity measures), maintain the currently best depth information value as currently best depth information value and the currently best weighted similarity measure as the currently best similarity measure, or when the weighted similarity measure of the current depth information value candidate fulfills an update condition with regard to the currently best similarity measure, e.g. the weighted matching cost is smaller than or smaller than or equal to the currently best matching cost (when matching costs are used as similarity measures), write the current depth information value candidate as currently best depth information value to the memory and write the weighted similarity measure of or associated to the current depth information value candidate as currently best similarity measure to the memory; and after all depth information value candidates have been processed, i.e. evaluated, select and output the currently best depth information value as depth information value for the current fragment of the current digital image.

Thus, the depth information value is estimated in an efficient (low complexity) but at the same time improved (with regard to estimation quality) way using sequential processing.

In an eighth possible implementation form of the image processing apparatus according to the seventh implementation form of the first aspect of the disclosure the similarity measure is a matching cost and the weighted similarity measure is a weighted matching cost, and the update condition is that the weighted matching cost is smaller than or smaller than or equal to the currently best matching cost, or the similarity measure is a matching probability and the weighted similarity measure is a weighted matching probability, the update condition is that the weighted matching probability is larger than or larger than or equal to the currently best matching probability.

Thus, the depth information value is estimated in an efficient (low complexity) but at the same time improved (with regard to estimation quality) way using sequential processing.

In a ninth possible implementation form of the image processing apparatus according to the first aspect of the disclosure as such or any one of the first to eighth implementation forms thereof, the memory is configured to store a set of previously selected depth information values of a set of previously processed fragments and the signal processing logic is further configured to:

compare the current depth information value candidate with at least one of the depth information values of the set of previously selected depth information values;

apply a weighting function to the calculated similarity measure of the current depth information value candidate to obtain the weighted similarity measure for the current depth information value candidate based on whether any of the depth information values of the set of previously selected depth information values is identical to the current depth information value candidate.

Thus, the depth information value is estimated in an efficient (low complexity) but at the same time improved (with regard to estimation quality) way based on a set of previously selected depth information values.

In a tenth possible implementation form of the image processing apparatus according to the first aspect of the disclosure as such or any one of the first to ninth implementation forms thereof, the signal processing logic is configured to compare the current depth information value candidate with a set of depth information values within a range around the previously selected depth information value and apply a weighting function to the calculated similarity measure of the current depth information value candidate to obtain the weighted similarity measure for the current depth information value candidate based on whether any of the depth information values of the set of depth information values within the range around the previously selected depth information value is identical to the current depth information value candidate.

Thus, the depth information value is estimated in an efficient (low complexity) but at the same time improved (with regard to estimation quality) way based on a set of depth information values within a range around a previously selected depth information value.

In an eleventh possible implementation form of the first aspect of the image processing apparatus according to the disclosure as such or any one of the first to tenth implementation forms thereof, the signal processing logic is configured to:

calculate first the similarity measure for the current fragment based on the previously selected depth information value;

compare the similarity measure with a threshold; and when the result of the comparison fulfills a skipping condition, select the previously selected depth information value as the depth information value of the current fragment of the current digital image; and/or when the result of the comparison does not fulfill the skipping condition:

calculate a similarity measure for the current fragment based on a further depth information value candidate defining a further reference fragment candidate of a digital reference image;

compare the further depth information value candidate with the previously selected depth information value;

apply a weighting function to the calculated similarity measure to obtain a weighted similarity measure for the current fragment based on the result of the comparison between the further depth information value candidate and the previously selected depth information value; and determine whether to select the further current depth information value candidate as the depth information value for the current fragment depending on the weighted matching cost of the depth information value candidate.

The threshold may be, for example, a penalty value used in the weighting function, or other values, e.g. derived based on experimental data and/or known or assumed characteristics of the currently processed digital image.

Thus, the depth information value is estimated in an efficient (low complexity) but at the same time improved (with regard to estimation quality) way, which allows for skipping or avoiding many processing steps if the skipping condition is fulfilled.

In a twelfth possible implementation form of the image processing apparatus according to the eleventh implementation form of the first aspect of the disclosure, the similarity measure is a matching cost and the skipping condition is that the matching cost is smaller than, or smaller than or equal to the threshold, or wherein the similarity measure is a matching cost and the skipping condition is that the matching cost is smaller than or smaller than or equal to the threshold, and wherein the threshold is equal to a penalty of the weighting function applied to the matching cost when the depth information value candidate is different to the previously selected depth information value or different to any depth information value comprised in a set of reference or previously selected depth information value candidates, or the similarity measure is a matching probability and the skipping condition is that the matching probability is larger than or larger than or equal to the threshold.

The threshold may be, for example, a penalty value used in the weighting function, or other values, e.g. derived based on experimental data and/or known or assumed characteristics of the currently processed digital image.

Thus, the depth information value is estimated in an efficient (low complexity) but at the same time improved (with regard to estimation quality) way, which allows for skipping or avoiding many processing steps if the skipping condition is fulfilled.

According to a second aspect the disclosure relates to an image processing apparatus for selecting a depth information value for a current fragment of a current digital image, wherein the image processing apparatus comprises memory and signal processing logic:

wherein the memory is configured to store a previously selected depth information value selected for a previously processed fragment of the same current digital image or a previously processed digital image of a same or different view and/or of a same or previous time instant;

wherein the signal processing logic is configured to:

calculate first a similarity measure for the current fragment based on the previously selected depth information value;

compare the similarity measure with a threshold; and when the result of the comparison fulfills a skipping condition, select the previously selected depth information value as the depth information value of the current fragment of the current digital image.

In a first possible implementation form of the image processing apparatus according to the second aspect of the disclosure, the signal processing logic is further configured to:

when the result of the comparison does not fulfill the skipping condition:

calculate a similarity measure for the current fragment based on a further depth information value candidate defining a further reference fragment candidate of a digital reference image;

compare the further depth information value candidate with the previously selected depth information value;

apply a weighting function to the calculated similarity measure to obtain a weighted similarity measure for the current fragment based on the result of the comparison between the further depth information value candidate and the previously selected depth information value; and determine whether to select the further current depth information value candidate as the depth information value for the current fragment depending on the weighted matching cost of the depth information value candidate.

The threshold may be, for example, a penalty value used in the weighting function, or other values, e.g. derived based on experimental data and/or known or assumed characteristics of the currently processed digital image.

Thus, the depth information value is estimated in an efficient (low complexity) but at the same time improved (with regard to estimation quality) way, which allows for skipping or avoiding many processing steps if the skipping condition is fulfilled.

In a second possible implementation form of the image processing apparatus according to the second aspect or the first implementation form of the first aspect, the similarity measure is a matching cost and the skipping condition is that the matching cost is smaller than, or smaller than or equal to the threshold, or wherein the similarity measure is a matching cost and the skipping condition is that the matching cost is smaller than or smaller than or equal to the threshold, and wherein the threshold is equal to a penalty of the weighting function applied to the matching cost when the depth information value candidate is different to the previously selected depth information value or different to any depth information value comprised in a set of reference or previously selected depth information value candidates, or the similarity measure is a matching probability and the skipping condition is that the matching probability is larger than or larger than or equal to the threshold.

The threshold may be, for example, a penalty value used in the weighting function, or other values, e.g. derived based on experimental data and/or known or assumed characteristics of the currently processed digital image.

Thus, the depth information value is estimated in an efficient (low complexity) but at the same time improved (with regard to estimation quality) way, which allows for skipping or avoiding many processing steps if the skipping condition is fulfilled.

Further implementation forms according to the second aspect are directly derivable from the further explanations and implementation forms described before with regard to the first aspect (and from the following detailed description of embodiments in accordance with the disclosure), which apply equally to the implementations forms according to the second aspect.

According to a third aspect the disclosure relates to an image processing method for selecting a depth information value for a current fragment of a current digital image. The image processing method comprises: storing a previously selected depth information value selected for a previously processed fragment of the same current digital image or a previously processed digital image of same or different view; calculating a similarity measure for the current fragment based on a depth information value candidate defining a reference fragment candidate of a digital reference image; comparing the depth information value candidate with sa previously selected depth information value selected for a previously processed fragment; applying a weighting function to the calculated similarity measure to obtain a weighted similarity measure for the current fragment based on the result of the comparison between the depth information value candidate and the previously selected depth information value; and determining whether to select the current depth information value candidate as the depth information value for the current fragment based on the weighted similarity measure of the depth information value candidate.

The image processing method according to the third aspect of the disclosure can be performed by the image processing apparatus according to the first or second aspect of the disclosure. Further features of the image processing method according to the third aspect of the disclosure result directly from the functionality of the image processing apparatus according to the first and second aspect of the disclosure and its different implementation forms.

According to a fourth aspect the disclosure relates to a computer program comprising program code for performing the method according to the third aspect of the disclosure or any of its implementation forms when executed on a computer.

The embodiments in accordance with the present disclosure can be implemented in hardware and/or software.

BRIEF DESCRIPTION OF THE DRAWINGS

Further embodiments in accordance with the disclosure will be described with respect to the following figures, in which.

In the various figures, identical reference signs will be used for identical or at least functionally equivalent features.

DETAILED DESCRIPTION OF EMBODIMENTS

In the following detailed description, reference is made to the accompanying drawings, which form a part of the disclosure, and in which are shown, by way of illustration, specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that a disclosure in connection with a described method may also hold true for the corresponding apparatus, device or system configured to perform the method and vice versa. For example, if a specific method step is described, a corresponding apparatus may include a unit to perform the described method step, even if such unit is not explicitly described or illustrated in the figures. Further, it is understood that the features of the various exemplary aspects described herein may be combined with each other, unless specifically noted otherwise.

Figure 1:
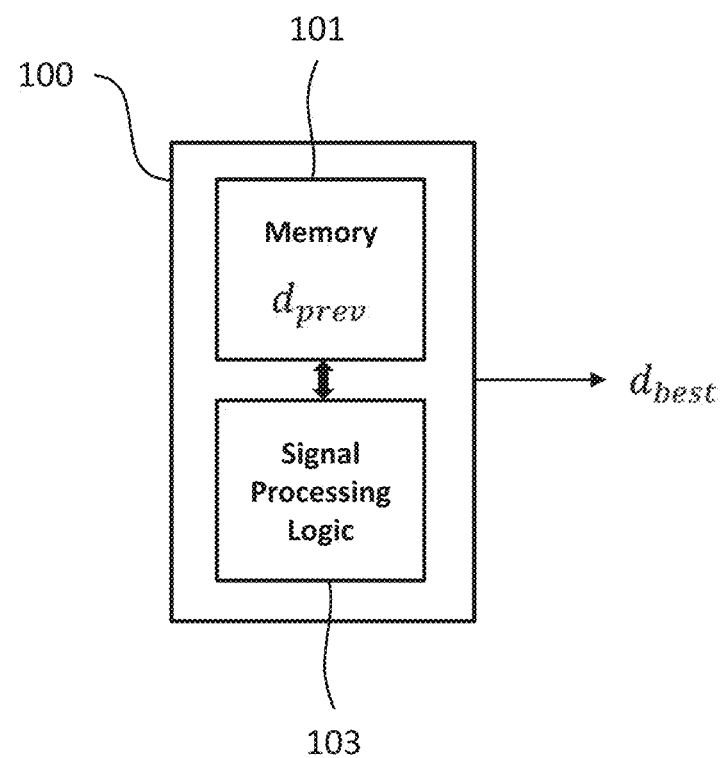
FIG. 1 shows a schematic diagram of an image processing apparatus according to an embodiment.

FIG. 1 shows a schematic diagram of an image processing apparatus 100 according to an embodiment. The image processing apparatus 100 is configured to select a depth information value $d_{best}$ for a currently processed fragment of a currently processed digital image. The depth information value $d_{best}$ can be, for example, a depth value, a disparity value, or an index or label representing a depth value or a disparity value. The currently processed fragment can be, for example, a currently processed pixel or a currently processed group of pixels of a digital image.

The image processing apparatus 100 comprises memory 101 configured to store a previously selected depth information value $d_{prev}$ selected for a previously processed fragment of the same current digital image or a previously processed digital image of the same or a different view.

Furthermore, the image processing apparatus 100 comprises signal processing logic 103. The signal processing logic 103 is configured to calculate a similarity measure for the current fragment based on a depth information value candidate $d_i$ defining a reference fragment candidate of a digital reference image, compare the depth information value candidate $d_i$ with the previously selected depth information value $d_{prev}$, apply a weighting function to the calculated similarity measure to obtain a weighted similarity measure for the current fragment based on the result of the comparison between the depth information value candidate $d_i$ and the previously selected depth information value $d_{prev}$ and determine whether to select the current depth information value candidate $d_i$ as the depth information value $d_{best}$ for the current fragment based on the weighted similarity measure of the depth information value candidate $d_i$.

The signal processing logic 103 can be a processor, e.g. a multi-purpose processor or a digital signal processor (DSP), an ASIC, a FPGA, CPU, GPU and the like.

The memory 101 may be part of the signal processing logic 103, e.g. an integrated memory, or a separate memory.

The depth information value can be, for example, a depth value, a disparity value, or an index or label representing a depth value or a disparity value. The fragment can be, for example, a pixel or a group of pixels of the current digital image and/or the digital reference image.

As will be described in more detail further below, the similarity measure can be, for example, a matching cost or a matching probability, wherein the matching cost is a measure indicating a difference between the current fragment and the reference fragment, which increases with increasing difference, and wherein the matching probability is a measure indicating a likelihood or probability that the current fragment and the reference fragment match, which decreases with increasing difference.

The previously processed fragment can be of the same current digital image or of a previously processed digital image of the same view—temporally preceding digital image—or of a different view—same or previous time instant.

By weighting the similarity measure, for instance, a matching cost, on the basis of a comparison of a current depth information value candidate for the current fragment with a previously selected or determined depth information value for a previous fragment embodiments the disclosure provide an image processing apparatus configured to determine a depth information value for the currently processes fragment in a powerful, yet computationally efficient way. The weighting function is configured to penalize transitions of depth information values when determining the depth information value for a currently processed fragment.

The signal processing logic 103 can be configured to process fragments in serial/sequential and parallel manner, in forward algorithms or any other optimization algorithm in which the convolution step can be substituted by the proposed weighting based on the previous depth information value(s).

The signal processing logic can be in particular configured to process different depth information value candidates, e.g. d or $d_i$, for a current fragment in serial respectively sequential manner, e.g. in a loop, or in parallel manner.

Figure 2:
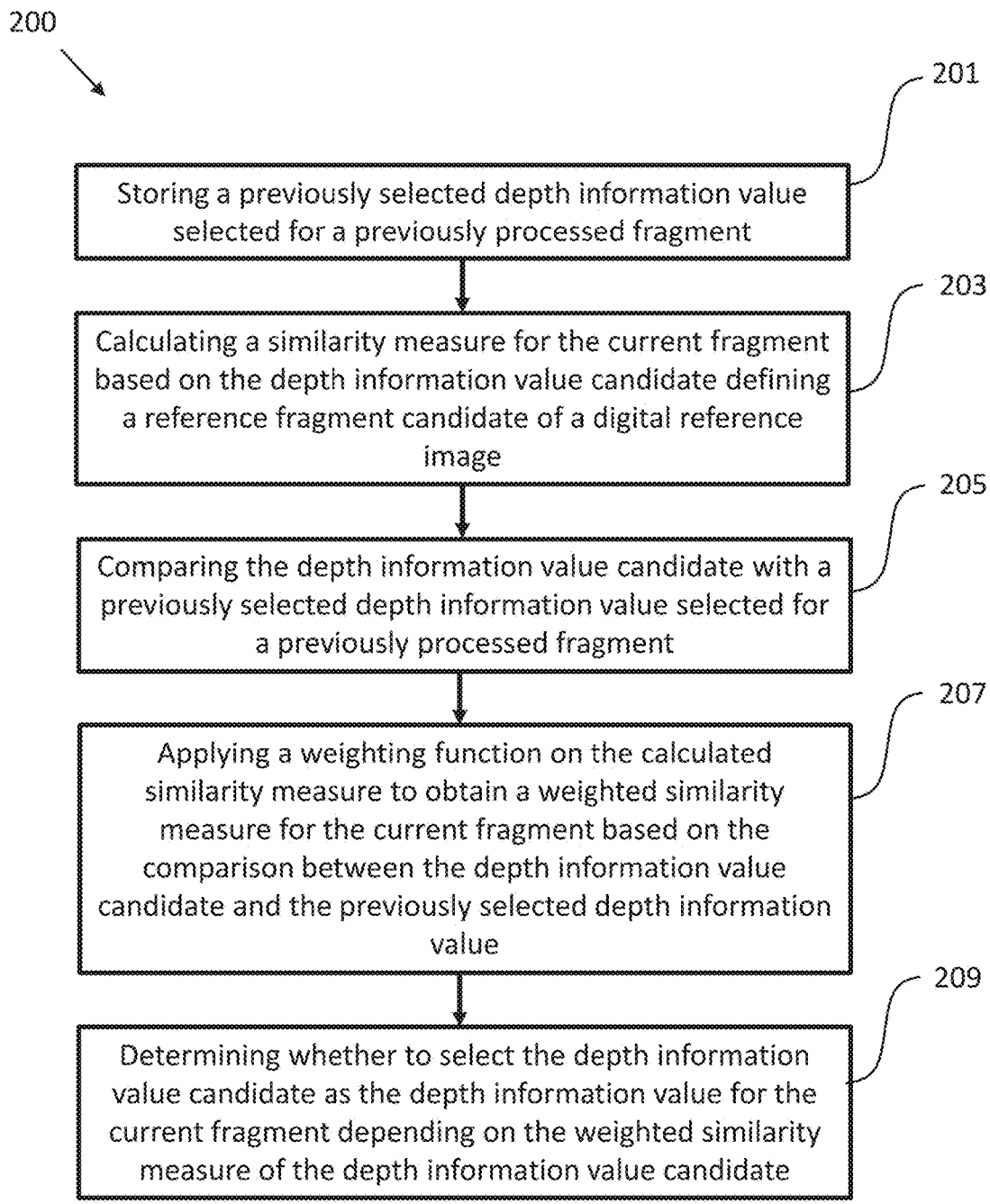
FIG. 2 shows a schematic diagram of an image processing method according to an embodiment.

FIG. 2 shows a schematic diagram of an image processing method 200 for selecting a depth information value $d_{best}$ for a current fragment of a current digital image according to an embodiment.

In step 201 of the method 200 a previously selected depth information value selected for a previously processed fragment is stored. In step 203 of the method 200 a similarity measure is calculated for the current fragment based on a depth information value candidate defining a reference fragment candidate of a digital reference image. In step 205 of the method 200 the depth information value candidate $d_i$ is compared with a previously selected depth information value selected for a previously processed fragment. In step 207 of the method 200 a weighting function is applied on the calculated similarity measure to obtain a weighted similarity measure for the current fragment based on the comparison between the depth information value candidate and the previously selected depth information value. In step 209 of the method 200 it is determined whether to select the depth information value candidate as the depth information value for the current fragment based on the weighted similarity measure of the depth information value candidate.

The signal processing logic 103 may be configured to perform the image processing method 200 (i.e. any of its embodiments and implementation forms described herein) in combination with the memory 101.

In the following, further implementations and embodiments of the image processing apparatus 100 and the image processing method 200 are described.

In an embodiment, which is herein also referred to as PREV-BEST-1, the similarity measure is a matching cost, which may also shortly be referred to as cost, and the weighted similarity measure is a weighted matching cost, which may also shortly be referred to as weighted cost. More specifically, the weighting function is a conditional penalty function, wherein the weighted matching cost $C_{current}(d)$ for a given image fragment and for a depth information value candidate d is defined as a sum of image fragment matching costs $M_{current}(d)$ and a constant penalty value, conditionally, if the given depth information value candidate is different from the depth information value $d_{prev}$ selected for a previously processed fragment, i.e.:

$$C_{current}(d) = M_{current}(d) + \begin{cases} 0 & \text{if } d = d_{prev} \\ \text{penalty} & \text{if } d \neq d_{prev} \end{cases} \quad (7)$$

As one person skilled in the art will appreciate, the above equation (7) can also be expressed as:

$C_{current}(d) = M_{current}(d) + T_{Potts}(d, d_{prev})$.

In an embodiment, the matching cost $M_{current}(d)$ can be, for instance, the sum of absolute differences (SAD) given by the above equation (2) or the sum of squared differences (SSD) given by the above equation (3). The matching cost $M_{current}(d)$ is also referred to as local matching cost because it does not consider the depth information values selected for previously processed fragments, e.g. in the vicinity of the currently processed fragment, and thus also no changes or transitions between depth information values of previously processed fragments and the currently processed fragment.

As described by equations (7) and (8), such embodiments comprise a weighting function which penalizes the matching cost $M_{current}(d)$ by a penalty value "penalty" when the depth information value candidate d (or $d_i$) is different from the previously selected depth information value $d_{prev}$ (e.g. when of a transition or change of depth information values with regard to previously processed fragments, e.g. fragments in the vicinity of the currently processed fragment), and maintains the matching cost $M_{current}(d) = C_{current}(d)$) when the depth information value candidate d (or $d_i$) is identical or equal to the previously selected depth information value $d_{prev}$ (e.g. when of no transition or change of depth information values with regard to previously processed fragments, e.g. fragments in the vicinity of the currently processed fragment).

Generally, the previously selected depth information value $d_{prev}$ can relate to any previously processed fragment. In an embodiment, the currently processed fragment is within the vicinity of the previously processed fragment, as will be explained in more detail further below in the context of FIG. 5. For example, $d_{prev}$ can be an estimated depth information value for a pixel or a pixel group directly neighboring the currently processed pixel or pixel group, for which the weighted matching cost $C_{current}(d)$ is calculated.

In an embodiment, the penalty value defined in above equation (7) can be determined through trial and error. As a rule of thumb, its value should be comparable to the level of noise present in the similarity measure, for instance the matching cost $M_{current}(d)$, for the processed images.

Figure 3:
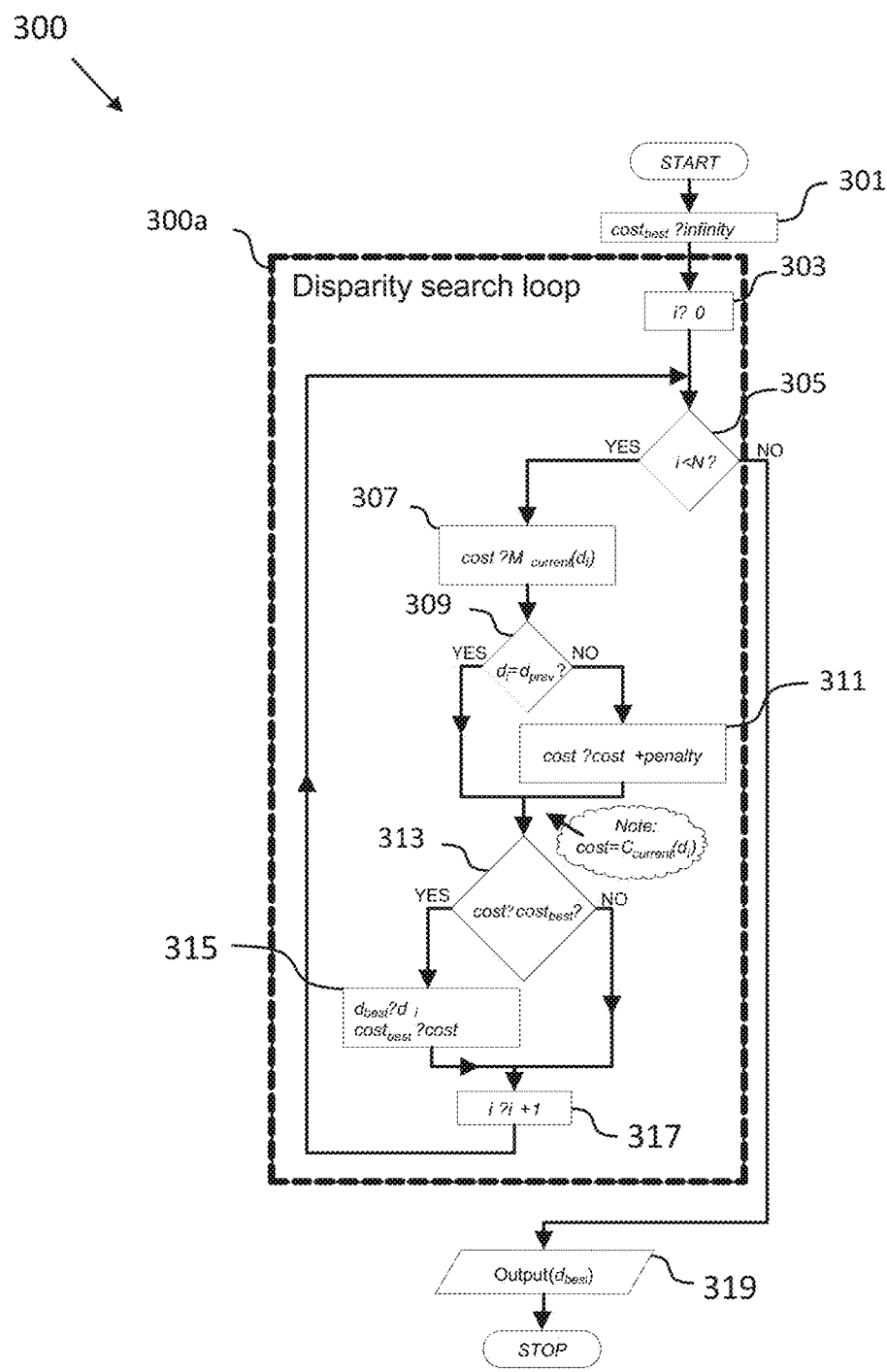
FIG. 3 shows a flow diagram of an algorithm implemented in an image processing apparatus according to an embodiment.

FIG. 3 shows a flow diagram of the PREV-BEST-1 algorithm, which is one of implementations for the image processing method 200 described and illustrated in FIG. 2, and which can be achieved in an image processing apparatus according to an embodiment, for instance in the image processing apparatus 100 shown in FIG. 1, wherein the algorithm or method may be performed by the signal processing logic 103 in combination with the memory 101.

In this embodiment, a set of N eligible depth information value candidates $d_i \in \{d_0, d_1, \ldots, d_{N-1}\}$ is considered, wherein i is the respective depth information value candidate index with i=0, ..., N−1. After the initialization steps 301 (setting the $cost_{best}$ variable to a maximum value, e.g. "infinity") and 303 (setting the iteration counter i to 0) in FIG. 3, for each eligible depth information value candidate $d_i$ (step 307 of FIG. 3), the weighted matching cost $C_{current}(d_i)$ is calculated (using a similarity measure in the form of a local fragment matching cost $M_{current}(d)$) and assigned to the cost variable (step 307 of FIG. 3). The depth information value candidate $d_i$ is compared to the depth information value $d_{prev}$ of the previous fragment (step 309 of FIG. 3). If the depth information value candidate $d_i$ and the depth information value $d_{prev}$ of the previous fragment are equal, the value of the cost variable, i.e. the cost of the depth information value candidate $d_i$, is directly compared to the value of the $cost_{best}$ variable, which represents the best or lowest cost so far determined for the current fragment with regard to the previously processed depth information value candidates. If the depth information value candidate $d_i$ and the depth information value $d_{prev}$ of the previous fragment are not equal, a penalty value is added to the value of the cost variable to obtain a penalized cost value, and the penalized cost value is assigned to the cost variable (step 311 of FIG. 3) and compared to the value of the $cost_{best}$ variable. If the value of the cost variable is smaller or equal to the value of the $cost_{best}$ variable (step 313 of FIG. 3), the current depth information value candidate $d_i$ is assigned to the variable $d_{best}$, which represents the best depth information value so far determined for the current fragment with regard to the previously processed depth information value candidates, and the value of the cost variable is assigned to the $cost_{best}$ variable (step 315 of FIG. 3). If the value of the cost variable is larger than the value of the $cost_{best}$ variable, the variables $d_{best}$ and $cost_{best}$ are maintained, i.e. not changed or updated. Afterwards the depth information value candidate index i is incremented (step 317 of FIG. 3) and the above steps are performed for the new current depth information value candidate index i.

In an embodiment, for the first iteration, i.e. for i=0, for example, the comparison between the values of the cost variable and the $cost_{best}$ variable may be omitted, and the value of the $cost_{best}$ variable may be just set to the cost value calculated for the depth information value candidate $d_0$, and the value of the $d_{best}$ variable may be just set to the depth information value candidate $d_0$. In other words, in the search loop 300a as shown in FIG. 3, the smallest weighted matching cost $d_i$) is found among all depth information value candidates $d_i$ and written to the $cost_{best}$ variable. The corresponding best depth information value d is stored in $d_{best}$ and fed to the output.

Once all depth information value candidates $d_i$ have been processed within the loop 300a, the final $d_{best}$ is outputted as the depth information value (step 319 of FIG. 3).

Referring back to the embodiments described based on FIGS. 1 and 2, FIG. 3 shows an embodiment of the disclosure, wherein the similarity measure is a matching cost, the weighted similarity measure is a weighted matching cost, the currently best similarity measure is a currently best matching cost, the weighting function is a transition function configured such that the (local) matching cost is only penalized when of a transition (i.e. when of a difference in depth information values between the currently processed depth information value candidate $d_i$ and the previously selected depth information value $d_{prev}$), and wherein the different depth information value candidates $d_i$ are processed sequentially (in a loop) while storing the currently best candidate values (currently best depth information value $d_{best}$ and the corresponding currently best matching cost $cost_{best}$) and updating those when a better candidate has been found.

Accordingly, step 307 of FIG. 3 corresponds to step 203 of FIG. 2, step 309 of FIG. 3 corresponds to step 205 of FIG. 2, the arrows YES and NO departing from step 309 and step 311 of FIG. 3 correspond to step 207 of FIG. 2, and e.g. steps 313, 315 and 319 in combination with steps 303, 305 and 317 (related to the loop for processing all depth information candidates) correspond to step 209 of FIG. 2.

The same mapping applies to the image processing apparatus described based on FIG. 1. The memory 101 can be, for example, configured to store additionally to the previously selected depth information values $d_{prev}$ the other values and indexes required for performing the embodiment according to FIG. 3, e.g. the currently best depth information candidate $d_{best}$, the currently best matching cost $cost_{best}$, the depth information value candidate index i, the value N indicating the number of depth information value candidates to be processed for selecting the depth information d (or $d_{best}$) for the currently processed fragment, the penalty value penalty, the cost variable cost (for storing the matching cost $M_{current}$ ($d_i$) and/or the weighted matching cost $C_{current}(d_i)$) for the currently processed depth information value candidate $d_i$. In a further embodiment the other values and indexes may be stored in another memory, e.g. in memory integrated into the signal processing logic 103 or a separate memory. This correspondingly applies to all other embodiments described hereinafter.

Figure 4:
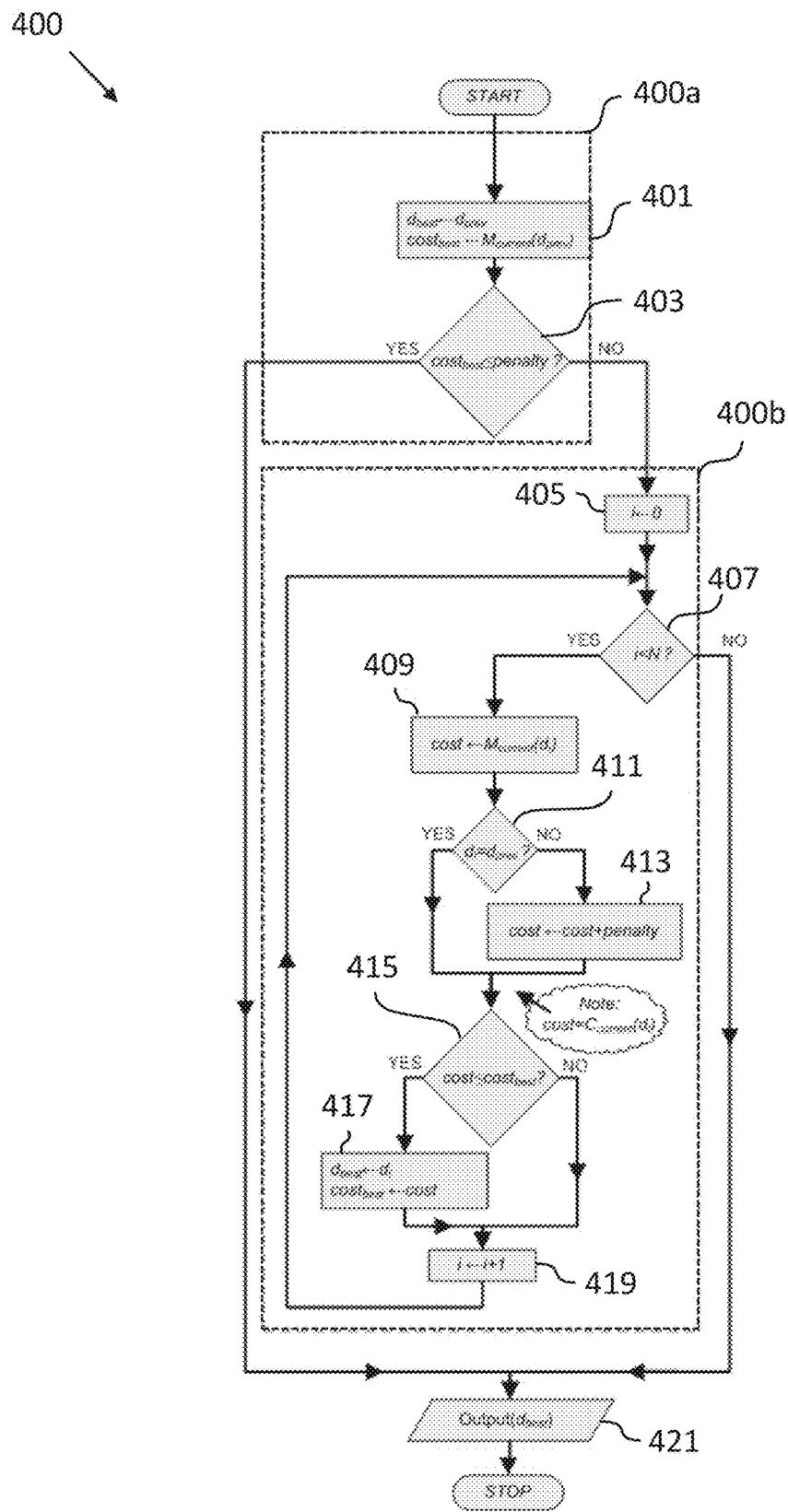
FIG. 4 shows a flow diagram of an algorithm implemented in an image processing apparatus according to another embodiment.

FIG. 4 shows a flow diagram of a further algorithm, which is herein referred to as PREV-BEST-2 algorithm, and which also forms an implementation of the image processing method 200 of FIG. 2, and which can be implemented in an image processing apparatus according to an embodiment, for instance the image processing apparatus 100 shown in FIG. 1, wherein the algorithm or method may be performed by the signal processing logic 103 in combination with the memory 101.

In the algorithm described in the context of FIG. 3, i.e. the PREV-BEST-1 algorithm, all eligible depth information value candidates are considered equally and thus are, for example, processed without any specific order (e.g. according to their index i from 0 to N−1).

In the algorithm shown in FIG. 4 the search for the depth information value is reordered in a portion 400a ("skipping evaluation portion") such that the previous depth information value $d_{prev}$ selected for the previously processed fragment is processed first (step 401 of FIG. 4). Its weighted matching cost $C_{current}(d_{prev})$ is calculated, which is equal to its matching cost $M_{current}(d_{prev})$, because no penalty is added to the matching cost related to the previous depth information value $d_{prev}$ (step 401 of FIG. 4). Step 403 of FIG. 4 defines an update condition in that when the calculated matching cost $M_{current}(d_{prev})$ is less than (or less than or equal to) the penalty value, then the depth information value search loop 400b is skipped. In such a case, $d_{prev}$ (assigned also to $d_{best}$) is immediately fed to the output (step 421 of FIG. 4). Such a skipping of the depth information value search loop 400b allows for substantial reduction of computational complexity.

As the loop 400b is identical to the loop 300a of the algorithm shown in FIG. 3, reference is made to the above detailed description of the steps 303 to 311 of loop 300a, which correspond to the steps 405 to 413 of FIG. 4.

In other words, the embodiment 400 described based on FIG. 4 is identical to the embodiment 300 described based on FIG. 3, except that the initialization 301 of FIG. 3 has been replaced by the skipping evaluation 400a of FIG. 4. The further explanations provided for FIG. 3 apply equally to FIG. 4.

Figure 5:
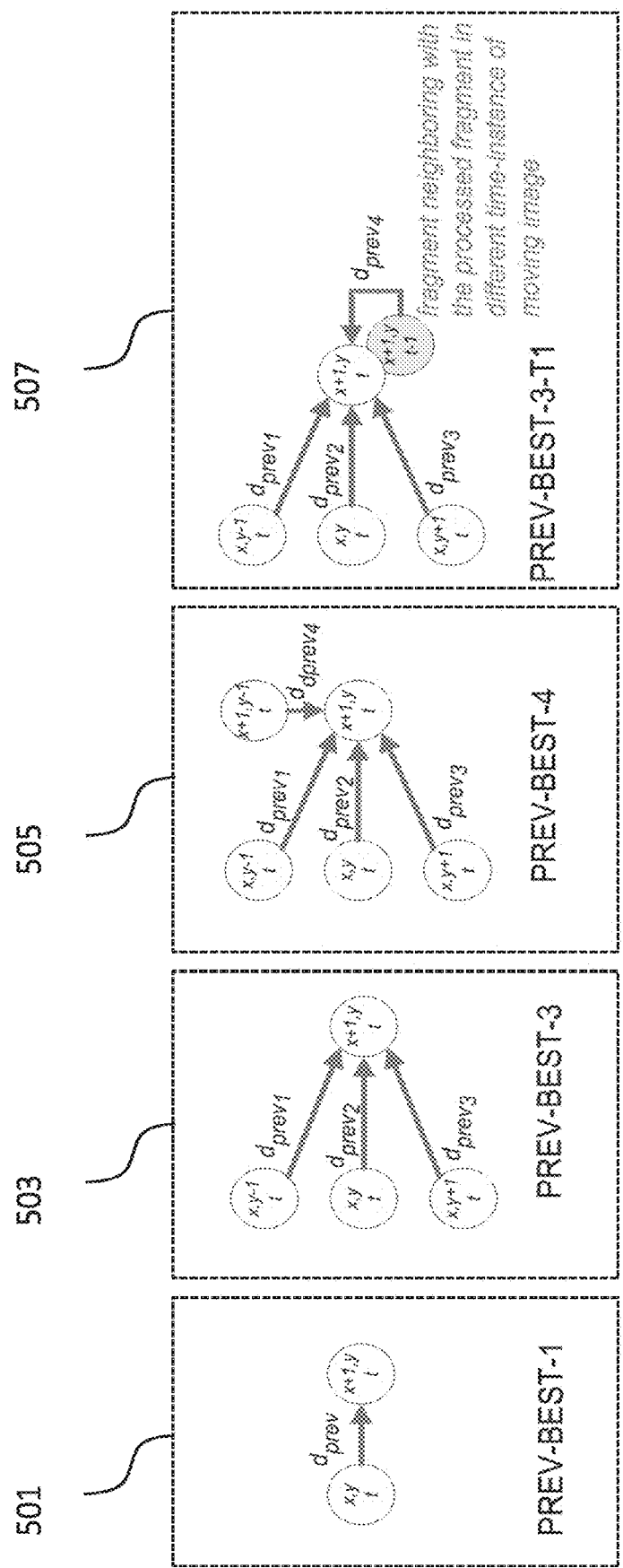
FIG. 5 shows a schematic diagram illustrating basic concepts of different algorithms implemented in image processing apparatuses according to different embodiments.

As one person skilled in the art will appreciate, in the algorithms shown in FIGS. 3 and 4 only a single depth information value $d_{prev}$ selected for a previously processed fragment is used for calculating the weighted similarity measure for a depth information value candidate, which is schematically illustrated in box 501 of FIG. 5. In FIG. 5, x and y refer to the coordinates of the fragments in horizontal (x) and vertical (y) direction, and t refers to the time instant of the fragment, wherein the arrows are directed from the previously processed fragments towards the currently processed fragment. The examples depicted in FIG. 5 relate to a typical application, where the fragments are processed horizontally from left to right. Accordingly box 501 depicts an embodiment, in which only the depth information value $d_{prev}$ of the horizontally left neighbor fragment of the same time instance (i.e. same current digital image) is used for calculating the weighted similarity measure of the depth information value candidate. Instead of the horizontally left neighbor fragment of the same time instance other previously processed fragments may be used, e.g. the upper left neighbor or lower left neighbor of the same time instance, the corresponding fragment (i.e. the fragment having the same x,y coordinates in the digital image) of a previous time instant (i.e. of a previous digital image, e.g. of the same view), the corresponding fragment (i.e. the fragment having the same x,y coordinates in the digital image) of a different view (i.e. of a digital image representing a different view or perspective to the same 3D scene), or neighbor fragments of the same or a different (e.g. previous) time instant and/or same or different views.

Typically neighbor fragments or corresponding fragments (i.e. same position/x,y coordinates in a different digital image) are most meaningful due to their spatial relationship to the currently processed fragment. However, in further embodiments the depth information values of other previously processed fragments may be used, e.g. when spatial characteristics of the digital image are known, for which depth information values of other previously processed fragments are more suitable to improve the depth information value estimation.

The same considerations apply for the PREV-BEST-2 embodiments described based on FIG. 4.

Embodiments of the present disclosure, furthermore, also cover implementations, where a plurality of depth information values of previously processed fragments are considered and used for calculating the weighted similarity measure, e.g. for determining whether the similarity measure shall be penalized or not.

For instance, in embodiments in accordance with the disclosure the weighted similarity measure (here weighted matching cost) can be calculated using a set of P previously estimated depth information values $d_{prev_k}$ as follows:

$$C_{current}(d) = \qquad (9)$$
$$M_{current}(d) + \begin{cases} 0 & \text{if } d \text{ in } \{d_{prev_1}, d_{prev_2}, d_{prev_3}, \ldots, d_{prev_P}\} \\ \text{penalty} & \text{otherwise} \end{cases}$$

As schematically illustrated in box 503 of FIG. 5, in an embodiment, $d_{prev_1}$, $d_{prev_2}$, $d_{prev_3}$ can be three exemplary estimated/selected depth information values for fragments neighboring to the currently processed fragment, for which the weighted matching cost $C_{current}(d)$ is currently calculated (referred to as PREV-BEST-3). These neighboring fragments can be in various spatial relationships to the currently processed fragment, a further one is illustrated in box 505 of FIG. 5, where four exemplary depth information values $d_{prev_{1\ldots4}}$ are considered (referred to as PREV-BEST-4).

Box 503 depicts an embodiment, in which the depth information values $d_{prev1}$ to $d_{prev3}$ of three left neighbor fragments of the same time instance (i.e. same current digital image) are used for calculating the weighted similarity measure, namely the top left neighbor ($d_{prev1}$) the horizontal left neighbor ($d_{prev2}$), and the bottom left neighbor ($d_{prev3}$).

Box 505 depicts an embodiment, in which additionally to the depth information values $d_{prev1}$ to $d_{prev3}$ of three left neighbor fragments of box 503 the depth information value $d_{prev4}$ of a top vertical neighbor of the same time instance (e.g. same current digital image) is used for calculating the weighted similarity measure.

As mentioned before, in embodiments the set of previously selected depth information values $d_{prev_k}$ can also include depth information values related to different time instances than the currently processed fragment, e.g. related to a previous (in time) image frame. In the exemplary PREV-BEST-3-T1 embodiment schematically illustrated in box 507 of FIG. 5, a set of four depth information values $d_{prev_{1\ldots4}}$ is used, where $d_{prev_{1\ldots3}}$ are spatial neighbors of the processed fragment in the same image (same as for box 503) and $d_{prev_4}$ is a co-located fragment (i.e. fragment having the same position or x,y coordinates in the digital image), neighboring with the processed fragment in time (i.e. comprised in the directly preceding digital image).

In further embodiments the set of previously selected depth information values $d_{prev_k}$ can also include depth information values with other neighbor relations, or other spatial relationships within the same digital image or digital images of the same or previous time instances and/or digital images of the same or different views, e.g. when the processing order is different (e.g. from right to left, or top-down, etc) and/or when the spatial or temporal characteristics of the digital image are known, for which depth information values of other previously processed fragments are more suitable to improve the depth information value estimation.

In an embodiment the set of P selected depth information values $d_{prev_k}$ is extended by depth information values that are similar, but not necessarily identical to depth information values selected for a previously processed fragment or fragments. For instance, in the case of the embodiment shown in FIG. 3, i.e. PREV-BEST-1 (and correspondingly FIG. 4: PREV-BEST-2), where only a single previously processed fragment with depth information value $d_{prev}$ is considered, the set of P selected depth information values can be extended to:

$$\{d_{prev}-m, \ldots, d_{prev}-1, d_{prev}, d_{prev}+1, \ldots, d_{prev}+n\}, \qquad (10)$$

where the values m and n can be predefined or adapted.

Figure 6:
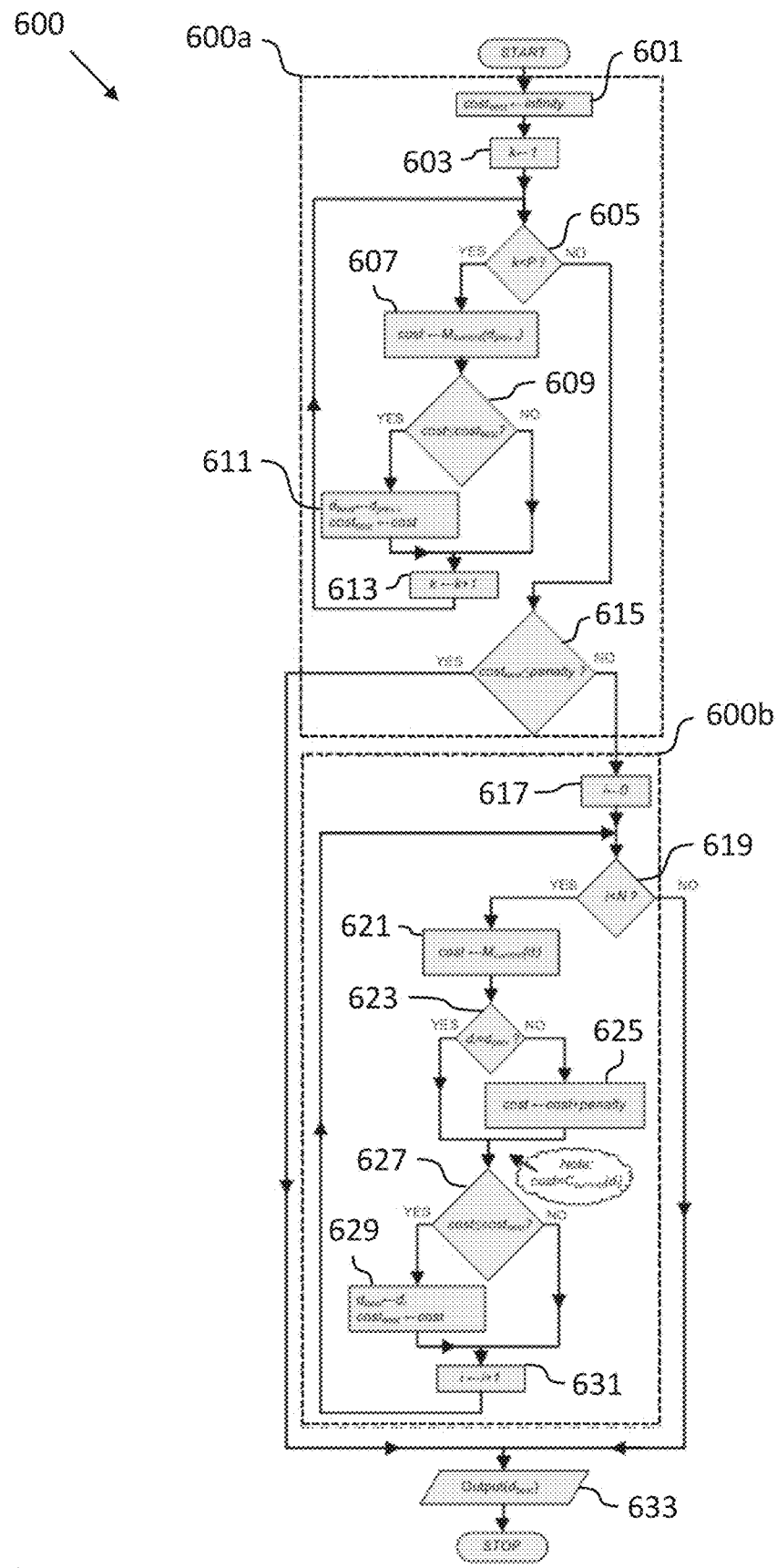
FIG. 6 shows a flow diagram of an algorithm implemented in an image processing apparatus according to an even further embodiment.

FIG. 6 shows a flow diagram of a further algorithm, which also forms an implementation of the image processing method 200 of FIG. 2, and which can be implemented in an image processing apparatus according to an embodiment, for instance the image processing apparatus 100 shown in FIG. 1, wherein the algorithm or method may be performed by the signal processing logic 103 in combination with the memory 101.

The embodiment shown in FIG. 6 is a variant of the embodiment shown in FIG. 4 for an extended set of depth information values $d_{prev_k}$, as defined, for instance, by above equations 9 or 10 or even a combination thereof. In such an embodiment, the set of P selected depth information values $\{d_{prev_1}, d_{prev_2}, d_{prev_3}, \ldots, d_{prev_P}\}$ from the previously processed fragments is considered first (see skipping evaluation loop 600a of FIG. 6). The best $d_{prev_k}$ which has the minimal weighted matching cost $C_{current}(d_{prev_k})$ is found (see steps 601-613 of FIG. 6) and if its weighted matching cost is less than (or less than or equal to) the penalty value then the further depth information value search loop 600b is skipped as a result of the skipping condition defined in step 615 of FIG. 6.

When the minimal weighted matching cost is not less than (or less than or equal to) the penalty value the loop 600b of FIG. 6 will be executed, by processing the N depth information value candidates d with regard to the set of P selected depth information values $\{d_{prev_1}, d_{prev_2}, d_{prev_3}, \ldots, d_{prev_P}\}$ from the previously processed fragments in a predetermined order. For example, steps 623 and 625 are performed for each depth information value candidate $d_i$ based on equations 9 or 10 (or a combination thereof).

In an alternative embodiment of the loop 600a, the set of P selected depth information values $\{d_{prev_1}, d_{prev_2}, d_{prev_3}, \ldots, d_{prev_P}\}$ from the previously processed fragments is processed in a predetermined order. The first depth information value $d_{prev_k}$ which has a weighted matching cost $C_{current}(d_{prev_k})$, which is less than (or less than or equal to) the penalty value, is output as $d_{best}$ for the current fragment, and the further depth information search is skipped. If none of the P selected depth information values $d_{prev_k}$ has a weighted matching cost, which is less than (or less than or equal to) the penalty value, the loop 600b is used to determine $d_{best}$ for the currently processed fragment.

As the loop 600b is essentially identical to the loop 300a of the embodiment shown in FIG. 3 (i.e. identical except that steps 623 and 625 are performed for each depth information value candidate $d_i$ based on equations 9 or 10 or a combination thereof), reference is made to the above detailed description of the steps 303 to 311 of loop 300a, which correspond to the steps 617 to 631 of FIG. 6.

Although embodiments of the image processing apparatus 100 and of the image processing method 200 have been primarily described based on implementations using matching costs as similarity measure and weighting functions, which maintain the matching cost when the depth information value candidate $d_i$ is equal to a previously selected depth information value and add a penalty value penalty when the depth information candidate $d_i$ is different from the previously selected depth information value(s), it should be noted that embodiments in accordance with the disclosure are not limited to those.

In further embodiments using matching costs as similarity measure the weighting function may be configured, when the depth information value candidate is identical to a previously selected depth information value, to increase the matching cost to a smaller extent (adding a second penalty value) compared to the case where the depth information value candidate is different from the previously selected depth information value(s). Thus, transitions are still (more) penalized compared to non-transitions. However, simply maintaining the matching cost as explained based on equations (7) to (9) and FIGS. 3, 4 and 6, provides reduced processing efforts.

In further embodiments using matching costs as similarity measure the weighting function may be configured to penalize a transition in a different manner than adding a penalty value, e.g. to multiply the matching cost by a penalty factor, e.g. larger than 1. Thus, transitions are also penalized compared to non-transitions. In even further embodiments, also the non-transition cases are penalized but less than the transition cases, e.g. by a second penalty factor which is smaller than the first penalty factor used for transition cases, e.g. both being larger than 1. Thus, transitions are still (more) penalized compared to non-transitions. However, simply adding a penalty value is typically computationally less complex than multiplications. Thus, weighting the matching cost as explained based on equations (7) to (9) and FIGS. 3, 4 and 6, provides reduced processing efforts.

In further embodiments a matching probability is used as similarity measure (instead of a matching cost). As the matching probability values are the higher the more similar the depth information values are, embodiments using the matching probability are configured to select the depth information value with the largest associated matching probability. Thus, the weighting functions for matching probabilities have, e.g., inverse characteristics compared to the weighting functions for the matching costs. For example, instead of adding a penalty value when of transitions (like for matching costs, see equations (7) to (9)), the weighting function may subtract a penalty value when of transitions and maintain the matching probability when of non-transition.

Furthermore, corresponding to the explanation provided for embodiments using matching costs, embodiments using matching probabilities may be configured to also penalize non-transition cases, e.g. by subtracting a second penalty value which is smaller than the first penalty value (used for the transition case), or to divide the matching probability by a penalty value, the penalty value being larger than 1.

In an embodiment, the similarity measure is a matching probability based on the Bhattacharayya coefficient, which indicates the probability of two distributions being similar and which is known to one person skilled in the art. In an alternative embodiment, the similarity measure is a matching probability, which is derived from a matching cost by defining the matching probability to be proportional, for instance, to exp(−"matching cost") or a similar equation. In an embodiment, the matching probability is normalized within a range from [0,1].

Although embodiments in accordance with the disclosure have been primarily described based on sequential processing (e.g. loops in FIGS. 3, 4 and 6), further embodiments in accordance with the disclosures comprise implementations, which process the different depth information value candidates $d_i$ completely or partially in parallel.

Referring to FIG. 3, parallel embodiments of apparatus 100 and method 200 may be configured to perform steps 307 to 311 in parallel, to compare the weighted costs and to select the depth information value candidate $d_i$ which has the lowest matching cost (or highest matching probability).

Similarly, referring to FIG. 4, parallel embodiments of apparatus 100 and method 200 may be configured to first perform a skipping evaluation based on the matching cost (or matching probability) of the previously selected depth information $d_{prev}$ (analog to steps 401 and 403) and to only perform the parallel processing of the different depth information value candidates d, when the skipping criterion is not fulfilled.

Similarly, referring to FIG. 6, instead of using a loop 600a, the matching costs (or matching probabilities) may be calculated in parallel to determine whether the skipping criterion is fulfilled, and if not, instead of using loop 600b determine the weighted matching costs for the different depth information value candidates $d_i$ in parallel (based on the different selected depth information values $d_{prevk}$).

Embodiments of the disclosure provide, amongst others, for the following advantages.

In embodiments in accordance with the disclosure, there is no need for a min-convolution calculation, like in Viterbi or Belief Propagation algorithms, which reduces operational complexity required for depth information value estimation (number of cycles or silicon area).

In embodiments in accordance with the disclosure, there is no need for additional storage for any intermediate data, such as cost function values (only the best selected depth information values are used, which are already stored as results of the depth information value estimation) and therefore memory consumption of the depth information value estimation is reduced in comparison to Viterbi or Belief Propagation algorithms.

In embodiments in accordance with the disclosure, the depth information value can be estimated in a single-pass procedure. Therefore, the required computational time is shorter and depth information value maps can be calculated on-the-fly.

In embodiments in accordance with the disclosure, the regularity of the calculated depth information value maps is very good in comparison to WTA algorithms and only slightly worse than in the case of the computationally more complex Viterbi algorithm.

In embodiments in accordance with the disclosure, the quality of the generated depth information value maps is substantially improved in comparison to WTA algorithms, while having practically the same algorithm implementation complexity.

In embodiments in accordance with the disclosure, for the majority of fragments of natural images there is no need for a full depth information value search. Thus, the speed of the implementation can be significantly improved. In the case of the Middlebury dataset, with RGB pixel matching, the embodiments in accordance with the disclosure allow for substantial reduction of complexity which results in an increase of the algorithm throughput, i.e. processed frames per second. Exemplary attained throughput improvements versus WTA algorithms are about: 240% for PC computer, 200% for Huawei Ascend P6 mobile phone (1÷4 threads) and 220% for Samsung Galaxy S4 mini (1 thread).

Embodiments in accordance with the disclosure may be implemented in a computer program for running on a computer system, at least including code portions for performing steps of a method according to the disclosure when run on a programmable apparatus, such as a computer system or enabling a programmable apparatus to perform functions of a device or system according to the disclosure.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Thus, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the disclosure is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

The invention claimed is:

1. An image processing apparatus for selecting a depth information value $d_{best}$ for a current fragment of a current digital image, the image processing apparatus comprising:
    memory configured to store a previously selected depth information value ($d_{prev}$; $d_{prev,k}$), ($d_{prev}$; $d_{prev,k}$) having been selected for a previously processed fragment; and
    signal processing logic configured to:
    calculate a similarity measure, $M_{Current}(d_i)$, for the current fragment based on a depth information value candidate $d_i$, $d_i$ defining a reference fragment candidate of a digital reference image, wherein the similarity measure indicates a difference between a value of the current digital image at the current fragment and a value of the digital reference image at the reference fragment candidate;
    compare the depth information value candidate $d_i$ with the previously selected depth information value ($d_{prev}$; $d_{prev,k}$);
    apply a weighting function to the calculated similarity measure to obtain a weighted similarity measure, $C_{current}(d_i)$ for the current fragment based on the comparison between the depth information value candidate $d_i$ and the previously selected depth information value ($d_{prev}$; $d_{prev,k}$); and
    determine whether to select the depth information value candidate $d_i$ as the depth information value $d_{best}$ for the current fragment based on the weighted similarity measure of the depth information value candidate $d_i$.

2. The image processing apparatus according to claim 1, wherein the similarity measure is a matching cost and the weighted similarity measure is a weighted matching cost, and wherein the weighting function is configured such that:
    when the depth information value candidate $d_i$ is different from the previously selected depth information value ($d_{prev}$; $d_{prev,k}$), the matching cost is increased with a penalty, and/or
    when the depth information value candidate $d_i$ is identical to the previously selected depth information value ($d_{prev}$; $d_{prev,k}$), the matching cost is maintained or increased to a smaller extent compared to the case where the depth information value candidate $d_i$ is different from the previously selected depth information value ($d_{prev}$; $d_{prev,k}$).

3. The image processing apparatus according to claim 2, wherein the weighting function is configured such that:
    when the depth information value candidate $d_i$ is different from the previously selected depth information value ($d_{prev}$; $d_{prev,k}$), the matching cost is increased by adding a first matching cost penalty to the matching cost to obtain the weighted matching cost, or by multiplying the matching cost with a first matching cost penalty to obtain the weighted matching cost, and/or when the depth information value candidate $d_i$ is identical to the previously selected depth information value ($d_{prev}$; $d_{prev,k}$), the matching cost is maintained or increased by adding a second matching cost penalty to the matching cost to obtain the weighted matching cost, or by multiplying the matching cost with a second matching cost penalty to obtain the weighted matching cost, wherein the second matching cost penalty is smaller than the first matching cost penalty.

4. The image processing apparatus according to claim 1, wherein the similarity measure is a matching probability and the weighted similarity measure is a weighted matching probability, and wherein the weighting function is configured such that, when the depth information value candidate $d_i$ is different from the previously selected depth information value ($d_{prev}$; $d_{prev,k}$), the matching probability is decreased, and/or such that, when the depth information value candidate $d_i$ is identical to the previously selected depth information value ($d_{prev}$; $d_{prev,k}$), the matching probability is maintained or decreased to a smaller extent compared to the case where the depth information value candidate $d_i$ is different from the previously selected depth information value ($d_{prev}$; $d_{prev,k}$).

5. The image processing apparatus (100) according to claim 4, wherein the weighting function is configured such that, when the depth information value candidate ($d_i$) is different from the previously selected depth information value ($d_{prev}$; $d_{prev,k}$), the matching probability is decreased by subtracting a first matching probability penalty from the matching probability to obtain the weighted matching probability, or by dividing the matching probability by a first matching probability penalty to obtain the weighted matching probability, and/or such that, when the depth information value candidate $d_i$ is identical to the previously selected depth information value ($d_{prev}$; $d_{prev,k}$), the matching probability is maintained or decreased by subtracting a second matching probability penalty from the matching probability to obtain the weighted matching probability, or by dividing the matching probability by a second matching probability penalty to obtain the weighted matching probability, wherein the first matching probability penalty is larger than the second matching probability penalty.

6. The image processing apparatus according to claim 1, wherein the signal processing logic is configured to:

calculate a similarity measure for each depth information value candidate of a set of depth information value candidates, each depth information value candidate $d_i$ defining a reference fragment candidate of the digital reference image;

compare each of the depth information value candidates $d_i$ of the set of depth information value candidates with the previously selected depth information value ($d_{prev}$; $d_{prev,k}$);

apply, for each of the depth information value candidates $d_i$, a weighting function to the calculated similarity measure to obtain for each of the depth information value candidates $d_i$ a corresponding weighted similarity measure for the current fragment, wherein for each of the depth information value candidates $d_i$ the weighting function is applied based on the corresponding result of the comparison; and select the depth information value $d_{best}$ for the current fragment from the depth information value candidates $d_i$ of the set of depth information value candidates based on the weighted similarity measures.

7. The image processing apparatus according to claim 6, wherein the similarity measure is a matching cost, and the signal processing logic is configured to select the depth information value $d_{best}$ from the depth information value candidates $d_i$ of the set of depth information value candidates, which has the smallest weighted matching cost; or wherein the similarity measure is a matching probability, and the signal processing logic is configured to select the depth information value $d_{best}$ from the depth information value candidates ($d_i$) of the set of depth information value candidates, which has the largest weighted matching probability.

8. The image processing apparatus according to claim 1, wherein the signal processing logic is configured to determine the depth information value $d_{best}$ for the current fragment by sequentially processing depth information value candidates $d_i$ of a set of depth information value candidates; wherein the signal processing logic is configured to:

calculate a similarity measure for a current depth information value candidate ($d_i$) of the set of depth information value candidates;

compare the current depth information value candidate ($d_i$) with the previously selected depth information value ($d_{prev}$; $d_{prev,k}$);

apply the weighting function to the similarity measure of the current depth information value candidate $d_i$ of the set of depth information value candidates to obtain a weighted similarity measure depending on the comparison;

compare the weighted similarity measure of the current depth information value candidate with a currently best similarity measure $cost_{best}$ associated with a currently best depth information value $d_{best}$;

when the weighted similarity measure of the current depth information value candidate does not fulfill an update condition with regard to the currently best similarity measure $cost_{best}$ maintain the currently best depth information value $d_{best}$ as currently best depth information value and the currently best similarity measure as the currently best similarity measure, and/or when the weighted similarity measure of the current depth information value candidate fulfills an update condition with regard to the currently best similarity measure $cost_{best}$, write the current depth information value candidate $d_i$ as currently best depth information value $d_{best}$ to the memory and write the weighted similarity measure of the current depth information value candidate ($d_i$) as currently best similarity measure $cost_{best}$ to the memory; and after all depth information value candidates $d_i$ have been processed, select the currently best depth information value $d_{best}$ as depth information value $d_{best}$ for the current fragment of the current digital image.

9. The image processing apparatus according to claim 8, wherein the similarity measure is a matching cost and the weighted similarity measure is a weighted matching cost, and the update condition is that the weighted matching cost is smaller than, or smaller than or equal to the currently best matching cost $cost_{best}$, or wherein the similarity measure is a matching probability and the weighted similarity measure is a weighted matching probability, and the update condition is that the weighted matching probability is larger than, or larger than or equal to the currently best matching probability.

10. The image processing apparatus according to claim 1, wherein the memory is configured to store a set of previously selected depth information values ($d_{prev,k}$) of a set of previously processed fragments; and
wherein the signal processing logic is further configured to:
compare the current depth information value candidate $d_i$ with at least one of the depth information values ($d_{prev,k}$) of the set of previously selected depth information values $d_{best}$; and
apply a weighting function to the calculated similarity measure of the depth information value candidate $d_i$ to obtain the weighted similarity measure for the current depth information value candidate $d_i$ based on whether any of the depth information values ($d_{prev,k}$) of the set of previously selected depth information values ($d_{prev,k}$) is identical to the current depth information value candidate $d_i$.

11. The image processing apparatus according to claim 1, wherein the signal processing logic is configured to:
compare the current depth information value candidate $d_i$ with a set of depth information values within a range around the previously selected depth information value ($d_{prev}$); and
apply a weighting function to the calculated similarity measure of the depth information value candidate $d_i$ to obtain the weighted similarity measure for the current depth information value candidate $d_i$ based on whether any of the depth information values ($d_{prev,k}$) of the set of depth information values within the range around the previously selected depth information value ($d_{prev}$) is identical to the current depth information value candidate $d_i$.

12. The image processing apparatus according to claim 1, wherein the signal processing logic is configured to:
calculate the similarity measure $M_{Current}(d_i)$, for the current fragment based on the previously selected depth information value ($d_{prev}$; $d_{prev,k}$);
compare the similarity measure with a threshold; and
when the result of the comparison fulfills a skipping condition, select the previously selected depth information value ($d_{prev}$; $d_{prev,k}$) as the depth information value ($d_{best}$) of the current fragment of the current digital image; and/or
when the result of the comparison does not fulfill the skipping condition:
calculate a similarity measure, $M_{Current}(d_i)$, for the current fragment based on a further depth information value candidate ($d_i$) defining a further reference fragment candidate of a digital reference image;
compare the further depth information value candidate ($d_i$) with the previously selected depth information value ($d_{prev}$; $d_{prev,k}$);
apply a weighting function to the calculated similarity measure to obtain a weighted similarity measure, $C_{Current}(d_i)$, for the current fragment based on the comparison between the further depth information value candidate $d_i$ and the previously selected depth information value ($d_{prev}$; $d_{prev,k}$); and
determine whether to select the further depth information value candidate ($d_i$) as the depth information value $d_{best}$ for the current fragment depending on the weighted matching cost of the depth information value candidate $d_i$.

13. The image processing apparatus according to claim 12,
wherein the similarity measure is a matching cost and the skipping condition is that the matching cost is smaller than, or smaller than or equal to the threshold;
wherein the similarity measure is a matching cost and the skipping condition is that the matching cost is smaller than, or smaller than or equal to the threshold, and wherein the threshold is equal to a penalty of the weighting function applied to the matching cost when the depth information value candidate is different to the previously selected depth information value or different to any depth information value comprised in a set of reference or previously selected depth information value candidates; or
wherein the similarity measure is a matching probability and the skipping condition is that the matching probability is larger than, or larger than or equal to the threshold.

14. An image processing method for selecting a depth information value $d_{best}$ for a current fragment of a current digital image, the image processing method comprising:
storing a previously selected depth information value ($d_{prev}$; $d_{previ}$), ($d_{prev}$; $d_{previ}$) having been selected for a previously processed fragment;
calculating a similarity measure $M_{Current}(d_i)$ for the current fragment based on a depth information value candidate $d_i$ defining a reference fragment candidate of a digital reference image, wherein the similarity measure indicates a difference between a value of the current digital image at the current fragment and a value of the digital reference image at the reference fragment candidate;
comparing the depth information value candidate $d_i$ with a previously selected depth information value ($d_{prev}$; $d_{previ}$) selected for a previously processed fragment;
applying a weighting function to the calculated similarity measure to obtain a weighted similarity measure $C_{Current}(d_i)$, for the current fragment based on the comparison between the depth information value candidate $d_i$ and the previously selected depth information value ($d_{prev}$; $d_{prev,k}$); and
determining whether to select the depth information value candidate $d_i$ as the depth information value ($d_{best}$) for the current fragment based on the weighted similarity measure of the depth information value candidate $d_i$.

15. A non-transient computer readable medium containing program instructions for causing a computer to perform the method of claim 14.

* * * * *